UNITED STATES PATENT OFFICE.

WILLIAM GARRITY, OF MALDEN, AND NICHOLAS AVERY, OF CAMBRIDGE, MASSACHUSETTS.

COATING METALLIC ARTICLES WITH VULCANIZED RUBBER.

SPECIFICATION forming part of Letters Patent No. 251,866, dated January 3, 1882.

Application filed November 23, 1881. (No specimens.)

*To all whom it may concern:*

Be it known that we, WILLIAM GARRITY, of Malden, in the county of Middlesex and State of Massachusetts, and NICHOLAS AVERY, of Cambridge, in the county and State aforesaid, citizens of the United States, have invented an Improvement in Coating Metallic Articles with Vulcanizable Rubber; and we hereby declare that the following is a full, clear, and exact description of the same.

Our invention relates particularly to an improvement in the manufacture of rubber rolls for clothes-wringing machines and other metallic articles coated with vulcanizable rubber, and has for its object to produce a more perfect and tenacious adhesion of the rubber to the metallic surface than heretofore, whereby all liability of the rubber becoming loose upon or separated from the metal is avoided, together with the objections incident thereto; and our invention consists in a simple and economical method of effecting the desired union between the rubber and the metallic surface to which it is applied, as will now be particularly described.

We take ten gallons of nitric acid of a strength of 41° Baumé and ten gallons of muriatic acid, of a strength of 22° Baumé, and after mixing them together in a suitable earthen vessel dissolve therein ten pounds of pure tin, preferably added in a finely-divided or granulated state. The iron wringer-roll shaft or other metallic article to be coated with vulcanizable rubber is then dipped into the above solution of acid and tin and allowed to remain therein about eight seconds, when it is removed and dipped into a weak solution of sulphuric acid and wiped with a woolen cloth, which causes its surface to be thoroughly cleansed of all impurities and left with a thin coating of muriate of tin, which enters the pores of the metal, closely unites therewith, and effectually and permanently protects its surface from rust. We now apply, by means of a brush or otherwise, to the metallic surface coated as above described with muriate of tin a layer of rubber cement, having mixed therewith litharge and sulphur in the proportion of about six pounds of litharge and three pounds of sulphur to seven and one-half gallons of rubber cement. The vulcanizable-rubber compound is then applied to the surface of the shaft or other metallic article immediately after the application thereto of the rubber cement, as above described, and vulcanized thereon in the usual manner.

The above-described method of treating the surface of the iron shaft or other metallic article, whereby a bright coating of muriate of tin is left thereon, serves to effectually cleanse and protect such surface from rust or corrosion after the rubber compound has been vulcanized thereon and when the article is in use, while the rubber cement and vulcanizable-rubber compound thereon are caused to adhere to the metallic surface coated with the muriate of tin with the greatest tenacity and with a permanency hitherto unattained by the action of the heat to which the article is subjected in the vulcanizing process, for the reason that the litharge, sulphur, and rubber combined in the cement form, when subjected to the heat required for vulcanizing, a chemical union with the muriate of tin on the shaft or other metallic surface, and consequently the adhesion of the rubber compound to the metal is of such a perfect and permanent nature that all liability of its becoming loosened or separated therefrom is entirely avoided, while the elasticity of the rubber is not impaired in the slightest degree—advantages of the utmost importance, especially in the manufacture of wringing-machine rolls, to which our invention is particularly adapted.

What we claim as our invention, and desire to secure by Letters Patent, is—

1. The herein-described process of coating metallic articles with vulcanized rubber, the same consisting in first coating the metallic article with muriate of tin, then applying thereto a layer of a composition formed of litharge, sulphur, and rubber cement, which will unite with the muriate of tin at the vulcanizing-heat, and finally applying the vulcanizable-rubber compound and vulcanizing the same, substantially as set forth.

2. As a new article of manufacture, a wringer-roll or other metallic article coated with rubber, formed by first coating the metallic surface with muriate of tin, over which is placed a layer of a composition formed of litharge, sulphur, and rubber cement, and then applying thereto the desired quantity of vulcanizable-rubber compound and vulcanizing the same, substantially as and for the purpose described.

3. In a wringer-roll or other metallic article coated with vulcanized rubber, the combination, with a metallic surface coated with muriate of tin, substantially as described, of a composition formed of litharge, sulphur, and rubber cement, united therewith by the action of the heat to which the article is subjected in the vulcanizing process, and a covering or coating of rubber compound vulcanized thereon, substantially as and for the purpose set forth.

4. In the process of coating metallic articles with vulcanized rubber, the employment of a composition formed of litharge, sulphur, and rubber cement for firmly uniting the vulcanizable-rubber compound to a metallic surface previously coated with muriate of tin, when the article is subjected to heat in the vulcanizing process, substantially as described.

Witness our hands this 21st day of November, A. D. 1881.

WILLIAM GARRITY.
NICHOLAS AVERY.

In presence of—
  P. E. TESCHEMACHER,
  W. J. CAMBRIDGE.